United States Patent
Kurczveil et al.

(10) Patent No.: US 12,436,338 B2
(45) Date of Patent: Oct. 7, 2025

(54) HITLESS OPTICAL POWER MONITOR

(71) Applicant: Hewlett Packard Enterprise Development LP, Spring, TX (US)

(72) Inventors: Geza Kurczveil, Goleta, CA (US); Raymond G. Beausoleil, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 330 days.

(21) Appl. No.: 18/116,696

(22) Filed: Mar. 2, 2023

(65) Prior Publication Data
US 2024/0295695 A1  Sep. 5, 2024

(51) Int. Cl.
*G02B 6/136* (2006.01)
*G02B 6/122* (2006.01)
*G02B 6/12* (2006.01)

(52) U.S. Cl.
CPC ............. *G02B 6/136* (2013.01); *G02B 6/122* (2013.01); *G02B 2006/12097* (2013.01); *G02B 2006/12173* (2013.01)

(58) Field of Classification Search
None
See application file for complete search history.

(56) References Cited

U.S. PATENT DOCUMENTS

| | | | |
|---|---|---|---|
| 7,257,288 B1 | 8/2007 | Strasser et al. | |
| 7,263,253 B2 | 8/2007 | Davis et al. | |
| 7,408,639 B1 | 8/2008 | Strasser et al. | |
| 7,424,181 B2 | 9/2008 | Popovic et al. | |
| 8,032,027 B2 | 10/2011 | Popovic | |
| 8,111,994 B2 | 2/2012 | Popovic | |
| 8,606,055 B2 | 12/2013 | Lipson et al. | |
| 9,455,788 B2 | 9/2016 | Boertjes | |
| 10,257,596 B2 | 4/2019 | Swinkels et al. | |
| 2005/0163418 A1 | 7/2005 | Wong et al. | |
| 2019/0267412 A1* | 8/2019 | Yagi | H10F 77/413 |
| 2022/0350178 A1* | 11/2022 | Hsu | G02B 6/125 |

* cited by examiner

Primary Examiner — Chad H Smith
(74) Attorney, Agent, or Firm — Yao Legal Services, Inc.

(57) ABSTRACT

One aspect can provide a method for fabricating a photonic integrated circuit (PIC) with an embedded optical power monitor. The method can include creating a photomask based on a design of the PIC, the photomask comprising a pattern defining an optical waveguide for embedding the optical power monitor. Creating the photomask can include introducing a predetermined level of roughness along at least one edge of the pattern defining the optical waveguide. The method can further include fabricating the PIC, which can include using the photomask to create the optical waveguide with the introduced roughness on a sidewall corresponding to the edge of the pattern, thereby allowing light absorbed by the roughness to create free carriers for detection by the optical power monitor.

20 Claims, 8 Drawing Sheets

HITLESS OPTICAL POWER MONITOR

BACKGROUND

Field

This disclosure is generally related to the fabrication of photonic devices. More specifically, this disclosure is related to the fabrication of photonic devices with hitless optical power monitors.

BRIEF DESCRIPTION OF THE FIGURES

In the figures, like reference numerals refer to the same figure elements.

DETAILED DESCRIPTION

A large optical system having multiple interconnected optical devices often relies on optical power monitors to monitor the performance of the individual optical devices to ensure the proper operation of the entire optical system. Optical power monitoring in a photonic integrated circuit (PIC) can be challenging due to the compact design of the PIC. Moreover, conventional optical-power monitoring approaches typically rely on extracting (e.g., via optical splitters) a small portion of the to-be-monitored light and routing the extracted light to a photodetector. Such techniques can result in an unwanted loss of optical power, especially for an optical system comprising multiple cascaded optical devices. Moreover, the uncertainty in the splitting ratio of the various splitters may also result in inaccurate power monitoring.

Hitless optical power monitors have been introduced to reduce loss related to optical-power monitoring. A waveguide-based hitless optical power monitor can detect the power of light propagating in a waveguide without absorbing any of the light beyond what is inherently scattered due to the sidewall roughness of the waveguide. More specifically, the hitless optical power monitor can be embedded in the waveguide within which the to-be-monitored light propagates (e.g., by building a capacitive structure (e.g., a metal-oxide-semiconductor (MOS) capacitor) surrounding the waveguide).

Figure 1A:
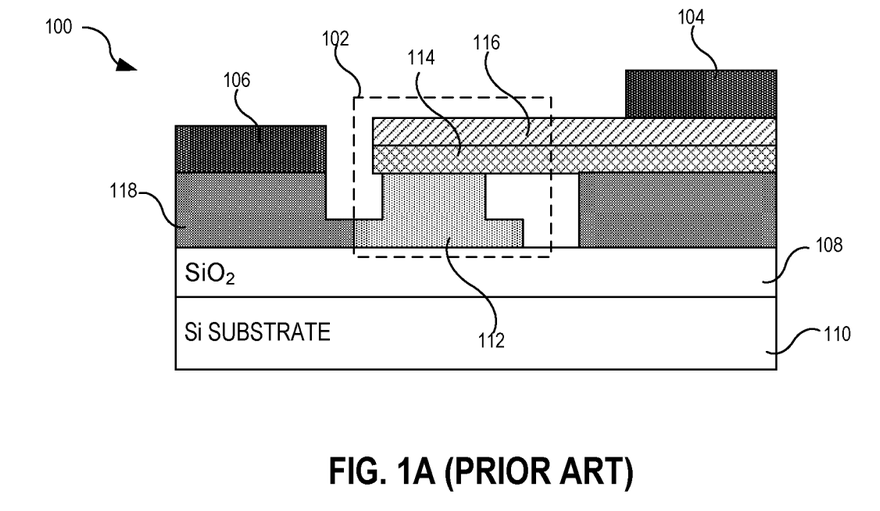
FIG. 1A illustrates an example of a waveguide-based optical power monitor, according to the prior art.

FIG. 1A illustrates an example of a waveguide-based optical power monitor, according to the prior art. In the example shown in FIG. 1A, waveguide-based optical power monitor 100 includes a MOS capacitor 102, a first electrode 104, a second electrode 106, a $SiO_2$ layer 108, and a Si substrate 110. MOS capacitor 102 can include a waveguide region 112, an oxide layer 114, and a buffer semiconductor layer 116. In one example, waveguide region 112 can include a Si waveguide with a low doping level (e.g., it can be p-type doped with a doping level less than $10^{16}/cm^3$) to minimize the waveguide loss. First electrode 104 can be an n-type electrode in contact with buffer semiconductor layer 116 comprising n-type doped semiconductor (e.g., GaAs), and second electrode 106 can be a p-type electrode in contact with p-type region 118 comprising p-type doped Si with a relatively high doping level to reduce the series resistance. Oxide layer 114 can include $Al_2O_3$ and have a thickness that is approximately 10 nm.

Figure 1B:
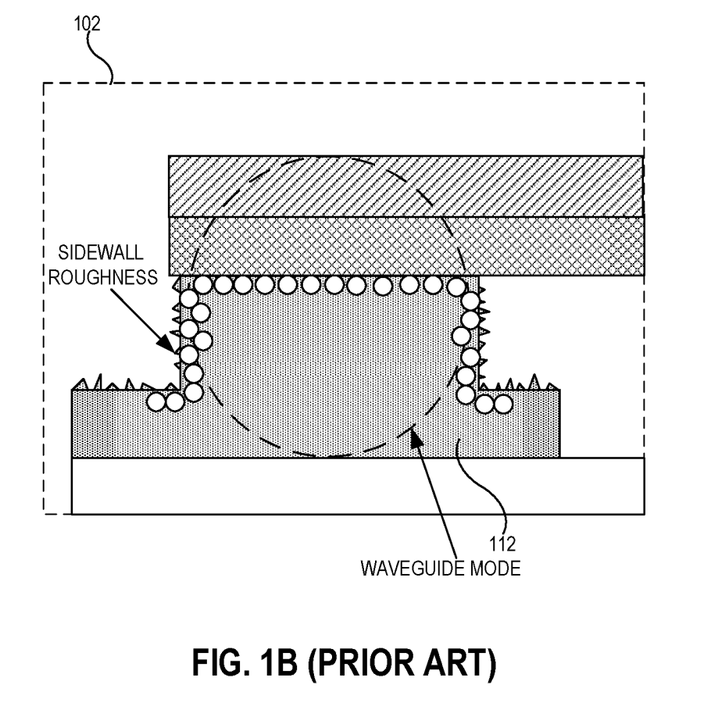
FIG. 1B shows an amplified view of the waveguide region, according to the prior art.

FIG. 1B shows an amplified view of waveguide region 112, according to the prior art. As can be seen in FIG. 1B, due to the imperfection in the fabrication processes (e.g., a photolithography process and a dry etching process), the sidewalls of waveguide 112 can be inherently rough. Note that the sidewall roughness is exaggerated in FIG. 1B for illumination purposes. Such roughness can create defect states for photons, causing free carriers to be generated when photons are absorbed by the defects (i.e., the roughness). The generated free carriers can affect the electrical conductance of waveguide region 112. The intensity of light propagating along waveguide region 112 can then be measured based on the current following through waveguide region 112.

Compared with optical-coupler-based power monitors, waveguide-based optical power monitors can provide a low-loss and compact solution for optical-power monitoring. Moreover, implementation of the waveguide-based hitless optical power monitors in PIC devices can be straightforward, because almost all PIC devices include optical waveguides, and the inherent sidewall roughness of the waveguides can guarantee the generation of the free carriers. However, the improvement of the semiconductor fabrication technology may lead to the reduction in sensitivity of the waveguide-based hitless optical power monitor. More specifically, as the process nodes (i.e., the minimum feature size achievable by the semiconductor fabrication processes) get smaller, the sidewalls of the Si waveguide become smoother. The reduced sidewall roughness can lead to reduced photon absorption and, hence, reduced free-carrier generation. When fewer free carriers are generated for the same light, the optical power monitor becomes less sensitive.

To address this power-monitoring sensitivity problem, according to some aspects of the instant application, the PIC fabrication process can be modified such that sidewall roughness can be intentionally enhanced at the power-monitoring sites. More specifically, if the PIC is to be fabricated using a process node that may result in less sensitive waveguide-based optical power monitors, the waveguide photomask can be modified to introduce rough edges at the power monitoring sites. For example, if a PIC is to be fabricated using a 65 nm process or other newer generation fabrication processes, the designer of the PIC can modify the waveguide mask to intentionally enhance the roughness on the sidewalls of the waveguide at the power-monitoring sites. Portions of the waveguide that are not used for optical power monitoring (i.e., without the embedded capacitor structures) can remain unchanged (e.g., can have smooth edges).

Figure 2:
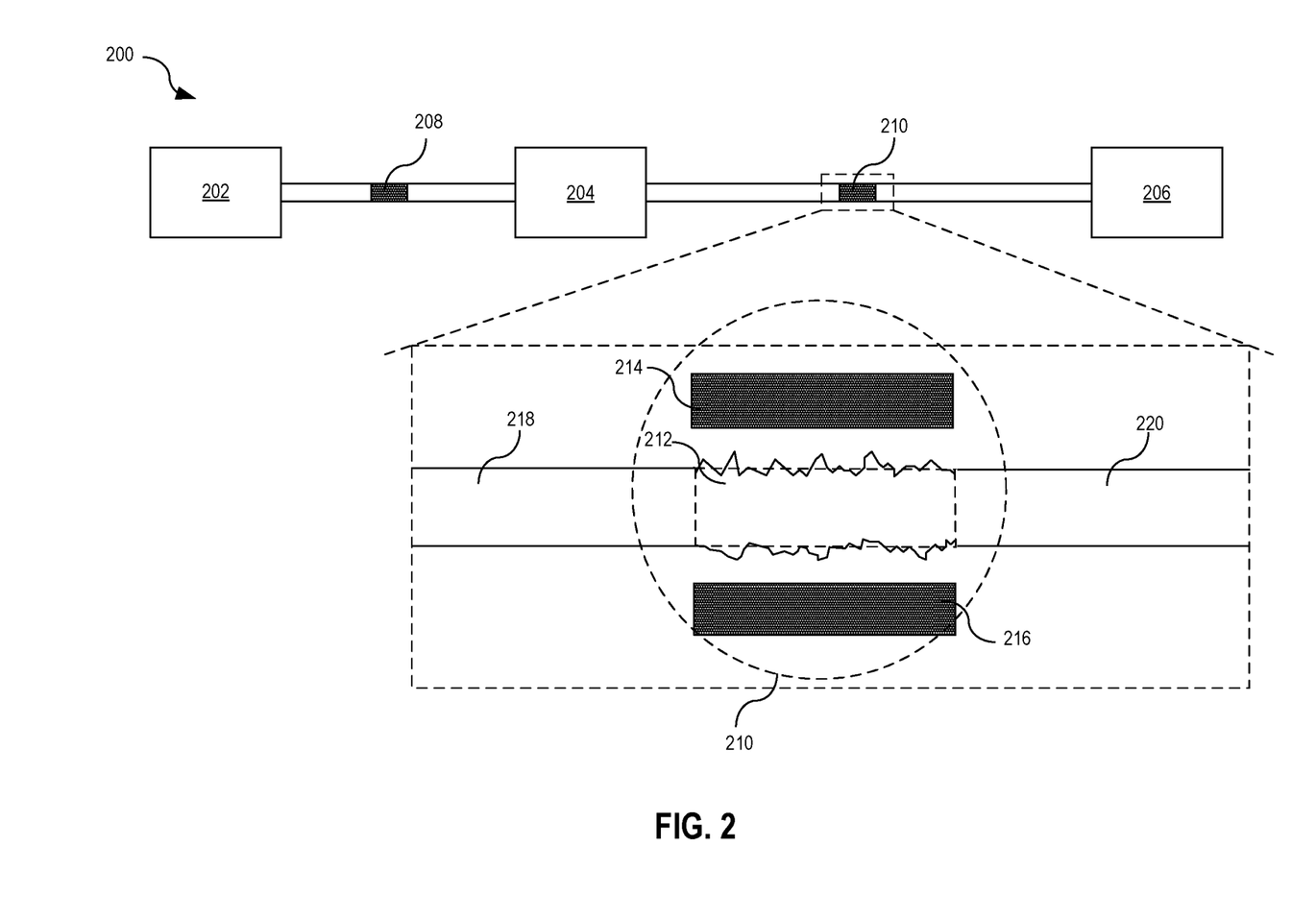
FIG. 2 illustrates an example of a photomask for defining waveguides in a photonic integrated circuit (PIC), according to one aspect of the instant application.

FIG. 2 illustrates an example of a photomask for defining waveguides in a photonic integrated circuit (PIC), according to one aspect of the instant application. In FIG. 2, a photomask 200 can include a number of device patterns defining a number of optical devices (e.g., device patterns 202, 204, and 206) and a number of waveguide patterns defining waveguides coupling these optical devices. To monitor the performance of the optical devices, the PIC can also include a number of waveguide-based optical power monitors that are embedded in certain sections of the waveguides, such as sections 208 and 210. These waveguide sections can also be referred to as power-monitoring sites.

FIG. 2 also shows an amplified view of power-monitoring site 210 and its surrounding regions. As can be seen in FIG. 2, power-monitoring site 210 can include a waveguide region 212 and contact regions 214 and 216. Waveguide region 212 defines a segment of the optical waveguide used for embedding the optical power monitor. Contact regions 214 and 216 can define the locations of the electrodes of the MOS capacitor. The electrodes can be similar to electrodes 104 and 106 shown in FIG. 1A.

Waveguide region 212 can be continuously connected to adjacent waveguide segments 218 and 220, which are not part of power-monitoring site 210. Light can propagate, continuously, through a waveguide defined by waveguide segments 218 and 220 and waveguide region 212, and the light intensity can be measured based on the number of free carriers generated in a waveguide segment defined by waveguide region 212. As discussed previously, the generation of the free carriers relies on the defect state caused by the surface defects (i.e., the sidewall roughness) in the waveguide. Fewer free carriers would be generated if the sidewalls of the waveguide are too smooth, leading to a low-sensitivity optical power monitor. To ensure a sufficient number of surface defects, according to some aspects, instead of smooth edges, waveguide region 212 of photomask 200 can include randomly generated rough edges such that the fabricated waveguide can have random roughness on its sidewalls at a location corresponding to power-monitoring site 210. On the other hand, regular waveguide segments (e.g., segments 218 and 220) in photomask 200 have smooth edges to ensure that the fabricated waveguide can have smooth sidewalls at corresponding segments to minimize loss.

The length of power-monitoring site 210 (i.e., the length of the waveguide edge with the random roughness) can be relatively short. According to some aspects, the length of waveguide region 212 can be between 50 μm and 200 μm. According to one aspect, waveguide region 212 can be approximately 100 μm long. This short distance ensures that the optical power loss due to this intentionally introduced sidewall roughness can be minimal. The depth of the roughness (i.e., the deviation from the original smooth edge shown as the dashed lines in FIG. 2) can be determined based on the actual dimensions and material system of the waveguide. In one example, the waveguide can be a silicon-on-insulator (SOI) rib waveguide that is 400 nm tall and 500 nm wide, with an etch depth of 225 nm. If the average depth of this intentionally created surface roughness is approximately 5 nm, and the correlation length of this random surface roughness is approximately 200 nm, then the waveguide loss for light with a wavelength of 1310 nm can be approximately 1 dB/cm. Therefore, the loss of optical power within waveguide region 212 can be approximately 0.01 dB, which can be negligible. According to some aspects, the random roughness on the edges of waveguide region 212 should be designed in such a way that the resulting optical power loss at power-monitoring site 210 is less than 0.1 dB. In the example shown in FIG. 2, both edges of waveguide region 212 have random roughness along the entirety of waveguide region 212. In an alternative example, waveguide region 212 can include one smooth edge and one edge with random roughness. In other words, the random roughness is only created on one edge of waveguide region 212, whereas the other edge is kept unaltered. In yet another example, the random roughness can be created on only a portion of one edge or both edges of waveguide region 212. Keeping one smooth edge or reducing the length of the rough edges can further reduce the waveguide loss at power-monitoring site 210.

Figure 3:
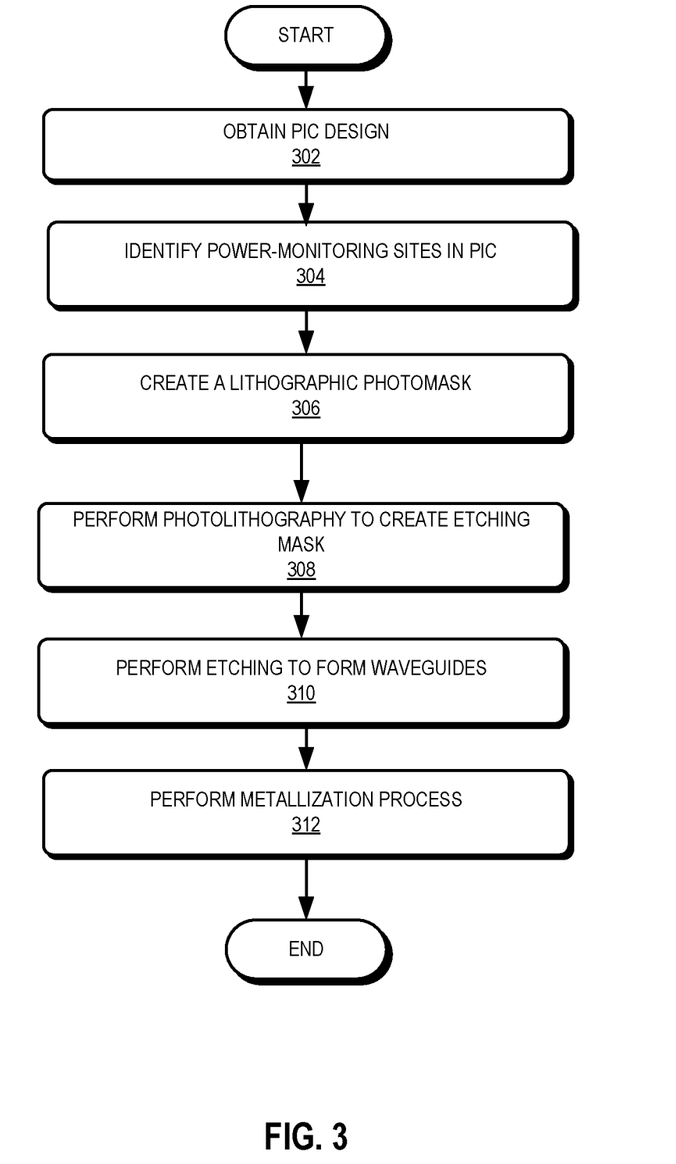
FIG. 3 presents a flowchart illustrating an example of a process for fabricating a PIC with waveguide-based power monitors, according to one aspect of the instant application.

FIG. 3 presents a flowchart illustrating an example of a process for fabricating a PIC with waveguide-based power monitors, according to one aspect of the instant application. During operation, a design of the PIC is obtained (operation 302). The PIC can include various types of optical devices (e.g., amplifiers, filters, resonators, etc.) and a number of optical waveguides coupling these optical devices. The PIC can also include at least one waveguide-based optical power monitor. A designer or an automated photomask-design tool can identify a number of power-monitoring sites in the PIC (operation 304). According to some aspects, each power-monitoring site can include a corresponding waveguide section.

A lithographic photomask can be created based on the identified power-monitoring sites (operation 306). More specifically, the photomask can include a number of device patterns defining a number of optical devices within the PIC and a number of waveguide patterns defining a number of waveguides coupling the optical devices. At least one waveguide pattern can include a section with randomly created rough or uneven edges, with the section corresponding to a power-monitoring site in the PIC. According to some aspects, one or both edges of the waveguide section can have randomly created roughness. The level of roughness can be determined based on the dimension and material system of the waveguide defined by the photomask and the total number of power-monitoring sites in the PIC. According to some aspects, the level of roughness can be designed in such a way that the total loss at all power-monitoring sites can be less than a predetermined value (e.g., 0.5 dB). For example, if there are five power-monitoring sites in the PIC, the power loss caused by the sidewall roughness at each power-monitoring site should be less than 0.1 dB. On the other hand, if there are 50 power-monitoring sites in the PIC, the power loss caused by the sidewall roughness at each power-monitoring site should be less than 0.01 dB. The limitation on the roughness level can ensure that the amount of power loss resulting from the waveguide-based optical power monitors is sufficiently small or negligible. The remaining portions of the waveguide pattern can have smooth edges like conventional waveguide patterns.

In one example, the waveguide pattern in the photomask can define the width of an SOI waveguide. In one example, the waveguide pattern can define an SOI waveguide that is 400 nm tall and 500 nm wide, with an etch depth of 225 nm. The length of the waveguide section with randomly created rough or uneven edges can be between 50 and 200 μm. The randomly generated edge roughness can have a mean value between 3 and 10 nm. Moreover, the correlation length of the random roughness can be between 50 and 200 nm.

Various mechanisms can be used to create edges with random roughness. For example, when designing the photomask, the system can first create waveguide patterns using conventional approaches, with the created waveguide patterns all having smooth edges. The system can then select a power-monitoring site (e.g., a particular waveguide section) and create random roughness at the edge(s) of the power-monitoring site. In one example, the system may select a predetermined number of points on the smooth edge and randomly displace these selected points away from the original smooth edge. A point can be randomly moved toward or away from the center of the waveguide. The rough edge can then be created by connecting these displaced points using straight line segments. The mean roughness can be the average of the absolute values of the deviation of the selected points from the original smooth edge. In an alternative example, the rough edge can be created by connecting these displaced points using fitted curves. The same process can be repeated for all power-monitoring sites.

A photolithography process can be performed using the photomask to create an etch mask needed for a subsequent etching process (operation 308). The photolithography process can include depositing a photoresist layer on a bare SOI wafer, exposing the photoresist layer to ultraviolet light under the photomask, and developing the photoresist layer to obtain a desired mask pattern for the subsequent etching process. Note that, depending on the type of photoresist (e.g., positive or negative photoresist) used in the photolithography process, the photomask can be a clear-field mask or a dark-field mask. The rough edges of the waveguide pattern can be similarly created regardless of the polarity of the photomask. Because the waveguide pattern in the photomask includes sections with rough edges, the remaining photoresist layer after development will also have sections with rough edges.

An etching process can be subsequently performed to form the waveguides (operation 310). The etching process can typically include a dry etching process, such as a Reactive Ion Etching (RIE) process. Due to the rough edges of the waveguide pattern in the photoresist layer, the sidewalls of a corresponding section of the fabricated waveguide can have random roughness. Such roughness is beyond the inherent sidewall roughness caused by the imperfect fabrication process and can increase the sensitivity of the embedded optical power monitor without causing significant waveguide loss. The fabrication process can further include a metallization process (operation 312), where metal electrodes are formed adjacent to the waveguide section having extra roughness on its sidewalls to complete the fabrication of the waveguide-based power monitor. A standard metallization process (e.g., liftoff or sputtering) can be used.

Figure 4A:
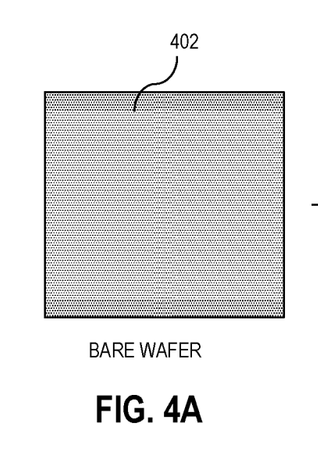
FIGS. 4A-4D illustrate the top views of the waveguide during the fabrication process, according to one aspect of the instant application.
Figure 4B:
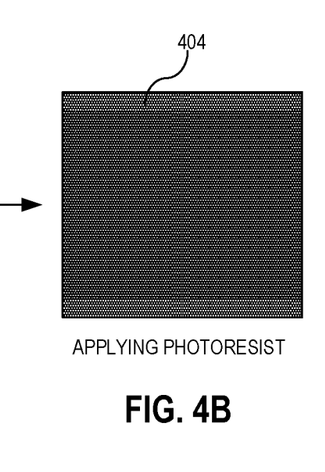
Figures 4C, 4D:
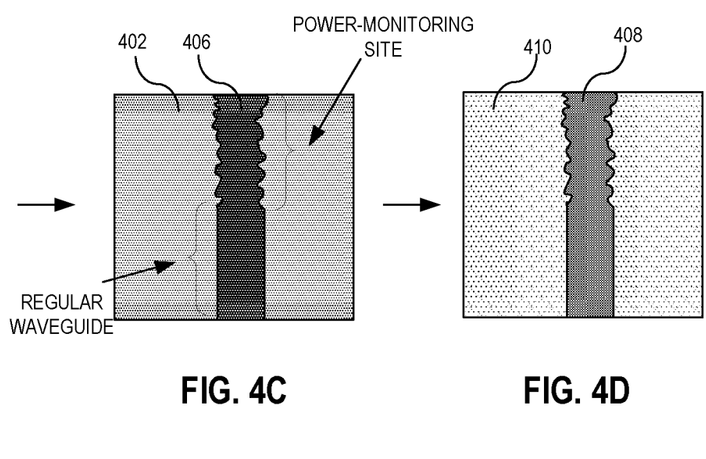

FIGS. 4A-4D illustrate the top views of the waveguide during the fabrication process, according to one aspect of the instant application. For simplicity of illustration, only a portion of a waveguide in the to-be-fabricated PIC is shown in these drawings, and other optical structures and components in the PIC are not shown. FIG. 4A illustrates the top view of a bare SIO wafer 402. FIG. 4B illustrates the top view of SIO wafer 402 with a photoresist layer 404 deposited on its surface. FIG. 4C illustrates the top view of SIO wafer 402 after the development of the photoresist layer. More specifically, the developed photoresist layer can include a waveguide etch mask 406. As can be seen from FIG. 4C, waveguide etch mask 406 can include a regular waveguide section with straight and smooth edges and a power-monitoring section with edges having random roughness. The edge roughness in the etch mask is transferred from the waveguide pattern in the photomask. In this example, random roughness is created on both edges of the power-monitoring section. It is also possible that only one edge has the randomly created roughness, whereas the opposite edge remains straight and smooth.

Figure 4E:
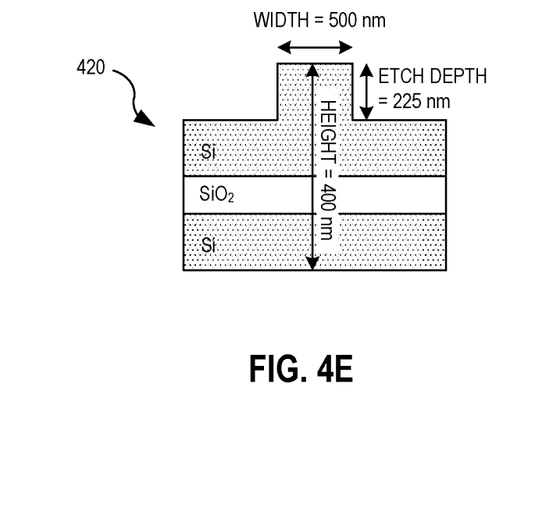
FIG. 4E illustrates the cross-sectional view of a rib waveguide, according to one aspect of the instant application.

FIG. 4D illustrates the top view of the wafer after a dry etching process and the removal of the photoresist. More specifically, a waveguide structure with a rib portion 408 and a base portion 410 is created. The dry etching process can create random roughness on the sidewall of rib portion 408 due to the corresponding rough edges of waveguide etch mask 406. FIG. 4E illustrates the cross-sectional view of a rib waveguide, according to one aspect of the instant application. Rib waveguide 420 can include a top Si layer, a middle $SiO_2$ layer, and a bottom Si layer. In one example, the height of waveguide 420 can be 400 nm, the etch depth can be 225 nm, and the width of rib waveguide 420 can be 500 nm, as shown in FIG. 4E.

Because the waveguide mode may overlap more with the sidewalls at a curved section of the waveguide, an optical power monitor embedded in the curved section of a waveguide can be more sensitive than the one embedded in the straight section. According to some aspects, one can design the PIC in such a way that one or more waveguide-based optical power monitors are embedded in the curved sections of the waveguides. If needed, an s-bend can be added in a straight waveguide to create the desired curvature.

Figure 5:
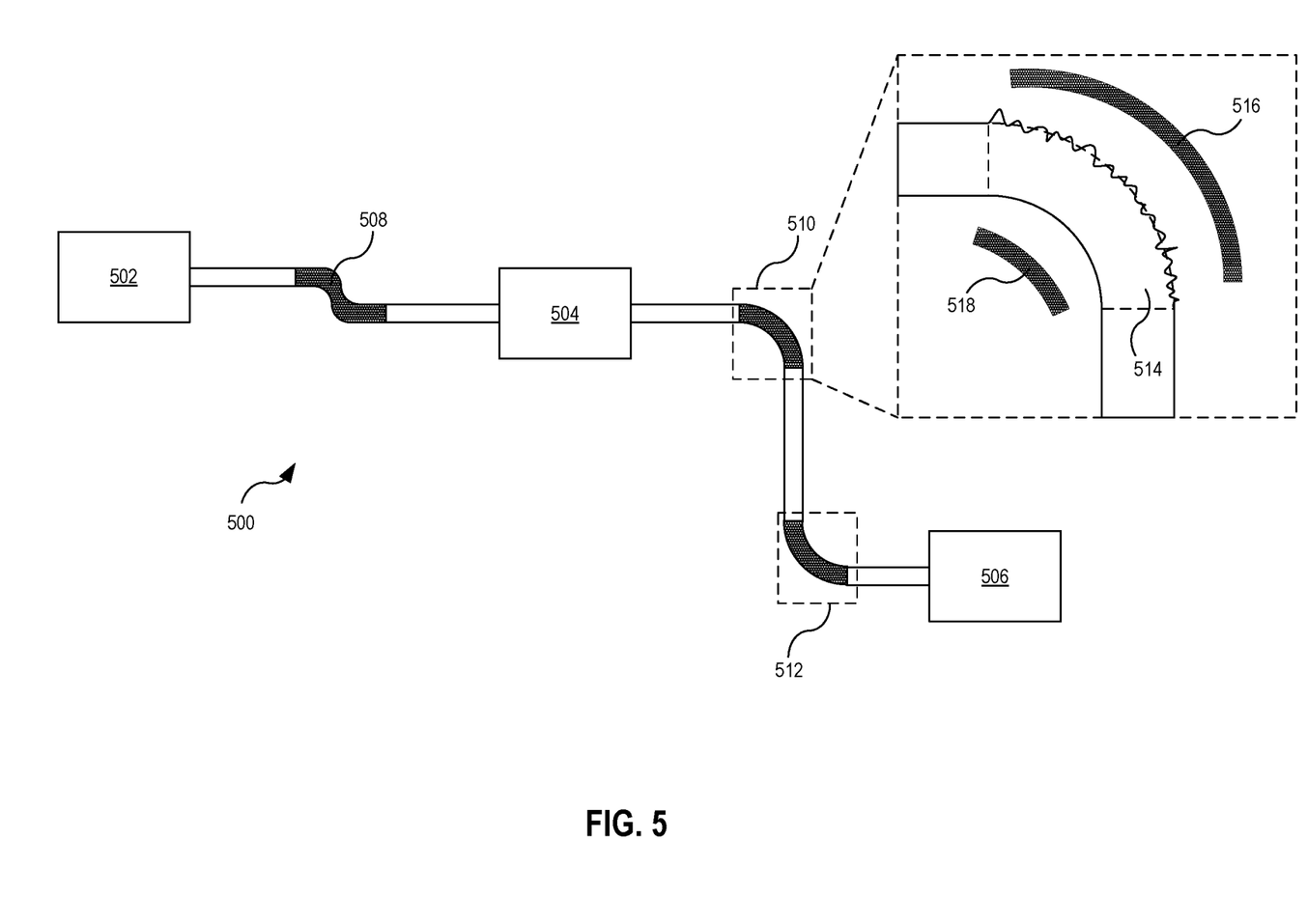
FIG. 5 illustrates an example of a photomask for defining waveguides in a PIC, according to one aspect of the instant application.

FIG. 5 illustrates an example of a photomask for defining waveguides in a PIC, according to one aspect of the instant application. In FIG. 5, a photomask 500 can include a number of patterns for defining various optical devices (e.g., device patterns 502, 504, and 506) and a number of waveguide patterns for defining a number of optical waveguides coupling the optical devices. To monitor the performance of the optical devices, the PIC can also include a number of waveguide-based optical power monitors that are embedded in certain sections of the waveguides. As discussed previously, the curved section of a waveguide allows the optical mode propagating along the waveguide to overlap more with the sidewalls. Hence, compared with a capacitive structure (e.g., MOS structure 102 shown in FIG. 1A) comprising a straight waveguide, a capacitive structure comprising a curved section of the waveguide can generate more free carriers from the same light intensity, resulting in a more sensitive optical power monitor.

In the example shown in FIG. 5, the waveguide patterns in photomask 508 can include curved sections (e.g., sections 508, 510, and 512) that can be used as power-monitoring sites. More specifically, section 508 can include an s-bend that is specifically added along a waveguide pattern connecting device patterns 502 and 504, and sections 510 and 512 can include arcs that are inherent portions of a waveguide pattern connecting device patterns 504 and 506. When designed carefully, each curved section (e.g., s-bend 508) only introduces minimal loss but can ensure sufficient sensitivity of a power monitor embedded in the curved section. For example, the radius of s-bend 508 or arcs 510 and 512 can be chosen based on the dimensions and material system of the waveguide to achieve the desired loss characteristics.

Depending on the processing technology used to fabricate the PIC, the dimensions/material system of the waveguide, and the bending radius, according to some aspects, it may not be necessary to intentionally create roughness on the edges of a curved section (e.g., s-bend 508). In such a situation, the sidewall roughness of the fabricated waveguide only depends on the precision of the fabrication process (e.g., the exposure and development of the photoresist and the dry etching of the Si). For a less-than-ideal fabrication process, the number of free carriers generated at the curved waveguide section defined by section 508 may be sufficient for power-monitoring purposes.

However, in certain situations, the process-limited sidewall roughness may not be sufficient to achieve the desired power-monitoring sensitivity, and the photomask should be designed to include random roughness on the edges of the curved power-monitoring sites. FIG. 5 also shows the amplified view of curved section 510, which is chosen as a power-monitoring site. As can be seen in FIG. 5, curved section 510 can include arc waveguide 514 and contact regions 516 and 518. Like contact regions 214 and 216 shown in FIG. 2, contact regions 516 and 518 can define the locations for the electrodes of the power monitor (i.e., the MOS capacitor).

In the example shown in FIG. 5, unlike waveguide region 212 shown in FIG. 2, arc waveguide pattern 514 only includes roughness on one of the two edges. More specifically, only the outer edge of arc waveguide pattern 514 includes the randomly generated roughness, whereas its inner edge remains smooth. It is also possible for arc waveguide pattern 514 to have intentionally generated roughness on both edges.

The fabrication process of the PIC defined by photomask 500 can be similar to the process shown in FIG. 3. Except for a specially designed photomask (i.e., a photomask with waveguide patterns having random rough or uneven edges), the fabrication process of the PIC with waveguide-based optical power monitors can be similar to a standard PIC fabrication process. There is no need to alter the photoresist exposure and development processes and the Si dry etching process, thus resulting in the straightforward implementation of this solution.

Figure 6:
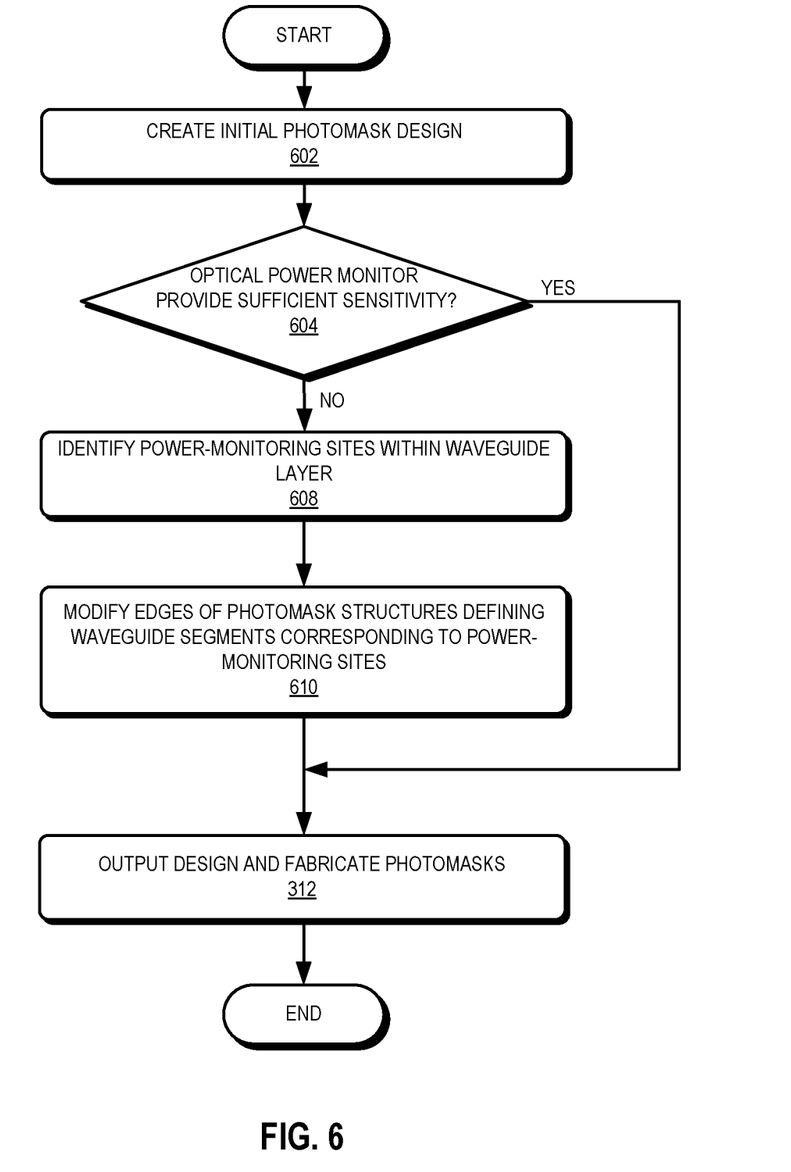
FIG. 6 presents a flowchart illustrating an example of a process for designing and fabricating a photomask, according to one aspect of the instant application.

FIG. 6 presents a flowchart illustrating an example of a process for designing and fabricating a photomask, according to one aspect of the instant application. During operation, an initial photomask design of a PIC can be created based on a set of design requirements (operation 602). According to some aspects, the initial photomask design can include a set of photomasks created using a conventional photomask design tool, and the patterns in the waveguide-layer photomask within the set of photomasks can all have smooth edges. The design requirements can include optical-power-monitoring requirements, which indicate the number and locations of the embedded waveguide-based optical power monitors. According to one aspect, when creating the initial photomask design, a mask designer can interact with the photomask design tool such that the optical power monitors can be placed at the curved sections of the waveguides. According to a further aspect, a curved section (e.g., an s-bend) can be added along a straight waveguide to provide the curvature needed to embed an optical power monitor.

The system can then determine whether the optical power monitors defined by the photomask can provide sufficient power-monitoring sensitivity (operation 604). According to some aspects, the system can estimate the sidewall roughness level of the fabricated waveguide based on the level of precision or the feature size of fabrication process. The system can then estimate the number of free carriers generated at each power-monitoring site based on the roughness level and determine whether the power-monitoring sensitivity meets the requirement. Note that the required power-monitoring sensitivity may be determined based on the expected intensity of light propagating along the waveguide.

If the optical power monitors cannot achieve the desired power-monitoring sensitivity, the system can identify power-monitoring sites within the waveguide-layer photomask (operation 608) and modify the edges of the patterns defining the waveguide segments corresponding to those power-monitoring sites (operation 610). Note that other layers of the photomasks do not need to be modified. According to some aspects, modifying the edges can include creating random roughness at one or both edges of the waveguide patterns. The roughness level (e.g., the mean of the roughness) can be determined based on the dimensions and material system of the waveguide. For example, the roughness level can be determined to ensure that each optical power monitor can provide measurement sensitivity above a predetermined sensitivity threshold while keeping the power loss below a predetermined loss threshold.

The system can then output the modified photomask design, and the set of photomasks can be fabricated based on the design output (operation 612). On the other hand, if the optical power monitors can achieve the desired power-monitoring sensitivity, the system can output the initial design, and the set of photomasks can be fabricated based on the initial design (operation 612).

Figure 7:
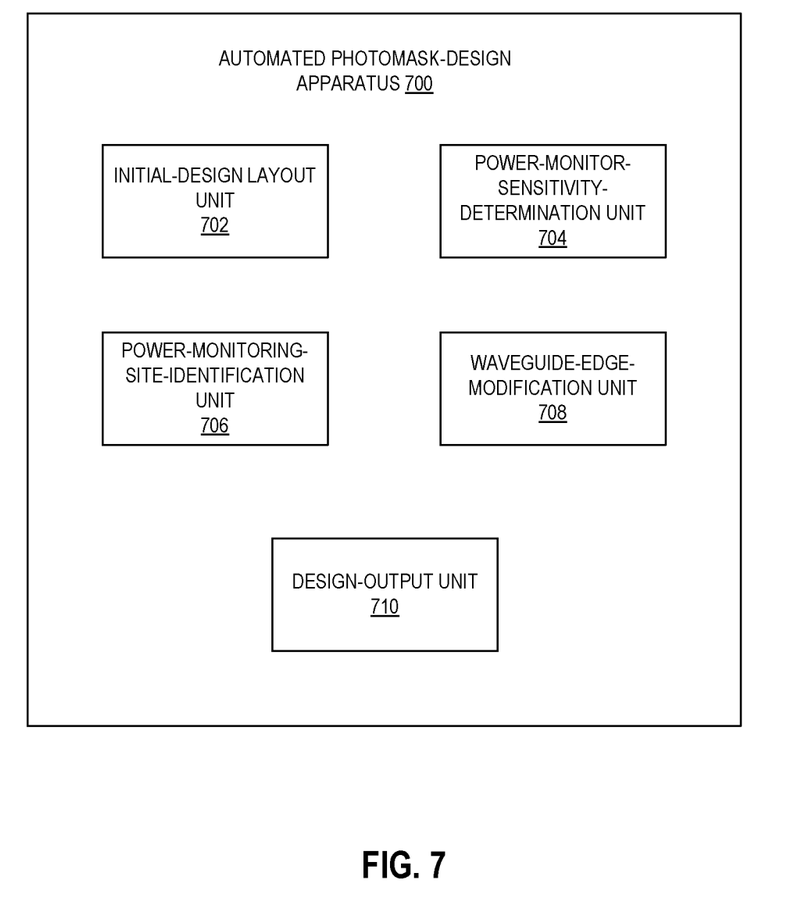
FIG. 7 illustrates the block diagram of an example of an automated photomask-design apparatus, according to one aspect of the instant application.

According to some aspects, an automated tool can be used to design the photomask. FIG. 7 illustrates the block diagram of an example of an automated photomask-design apparatus, according to one aspect of the instant application. Automated photomask-design apparatus can include an initial-design layout unit 702, a power-monitor-sensitivity-determination unit 704, a power-monitoring-site-identification unit 706, a waveguide-edge-modification unit 708, and a design-output unit 710.

Initial-design layout unit 702 can generate an initial photomask design of a PIC. More specifically, initial-design layout unit 702 can generate an initial waveguide-layer photomask based on a set of design requirements, which can include power-monitoring requirements. Waveguide patterns in the initial waveguide-layer photomask can have smooth edges. Power-monitor-sensitivity-determination unit 704 can determine whether the sensitivity of optical power monitors defined by a photomask design (which can be obtained from initial-design layout unit 702 or an external file) can meet the desired sensitivity requirement. For example, power-monitor-sensitivity-determination unit 704 can estimate the power-monitoring sensitivity based on the expected sidewall roughness resulting from the fabrication process and the dimensions/material system of the optical waveguide.

Power-monitoring-site-identification unit 706 can identify, within the waveguide-layer photomask, segments of the waveguides used as power-monitoring sites. In one example, the power-monitoring sites can be identified based on the locations of the contact regions (e.g., contact regions 214 and 216 shown in FIG. 2). Waveguide-edge-modification unit 708 can be responsible for modifying the edges of the waveguide patterns corresponding to the identified power-monitoring sites. More specifically, at each power-monitoring site, waveguide-edge-modification unit 708 can create random roughness of a predetermined level on one or both edges of the corresponding waveguide pattern (e.g., by creating random displacements of points on the edge of the waveguide pattern). The random distribution of the roughness (e.g., the distribution function and parameters) can be defined by the user. Design-output unit 710 can be responsible for outputting the photomask design to a photomask-fabrication tool such that a set of photomasks can be fabricated based on the design.

Figure 8:
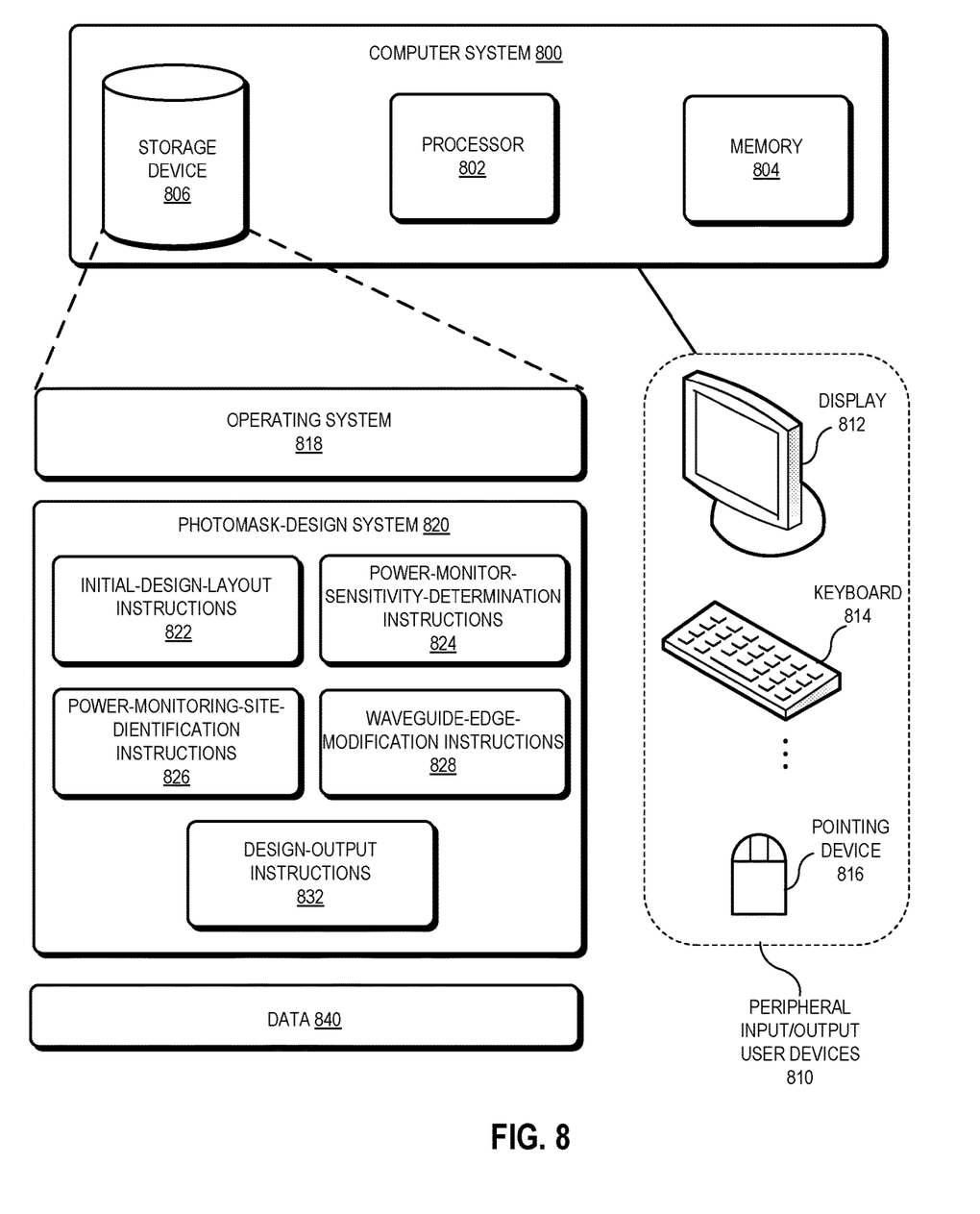
FIG. 8 illustrates an example of a computer system that facilitates the design of a photomask for a PIC with embedded optical power monitors, according to one aspect of the instant application.

FIG. 8 illustrates an example of a computer system that facilitates the design of a photomask for a PIC with embedded optical power monitors, according to one aspect of the instant application. Computer system 800 can include a processor 802, a memory 804, and a storage device 806. Furthermore, computer system 800 can be coupled to peripheral input/output (I/O) user devices 810, e.g., a display device 812, a keyboard 814, and a pointing device 816. Storage device 806 can store an operating system 818, a photomask-design system 820, and data 840.

Photomask-design system 820 can include instructions, which when executed by computer system 800, can cause computer system 800 or processor 802 to perform methods and/or processes described in this disclosure. Specifically, by executing these instructions, computer system 800 can implement the various functionalities for the automated design of a photomask for a PIC with embedded optical power monitors. Photomask-design system 820 can include instructions for generating an initial photomask design (initial-design-layout instructions 822), instructions for determining the sensitivity of optical power monitors defined by the photomask (power-monitor-sensitivity-determination instructions 824), instructions for identifying power-monitoring sites in the waveguide layer (power-monitoring-site-identification instructions 826), instructions for modifying edges of the waveguide patterns corresponding to the power-monitoring sites (waveguide-edge-modification instructions 828), and instructions for outputting the photomask design (design-output instructions 830).

In general, the disclosure describes a system and method for fabricating a PIC with embedded optical power monitors. To increase the sensitivity of the embedded waveguide-based optical power monitors, the system can modify the waveguide patterns in a conventional photomask. More specifically, one or both edges of a waveguide pattern defining a waveguide segment for embedding an optical power monitor can be modified to include random roughness. The roughness level can be determined based on the desired power-monitoring sensitivity, the precision of the waveguide fabrication process, and the dimensions and material system of the to-be-fabricated waveguide. The photomask can be used in a subsequent photolithography process to create a waveguide etch mask, and the random edge roughness can be transferred from the photomask to the etch mask. A dry etching process using the etch mask can then create waveguide segments with corresponding roughness on their sidewalls. Such roughness can interact with the propagating light to generate free carriers that can affect the conductivity of the waveguide region. The number of free carriers generated within the waveguide region can affect the power-monitoring sensitivity. Therefore, by carefully designing a photomask with an appropriate level of edge roughness, one can achieve the desired sensitivity of the embedded optical power monitors.

One aspect can provide a method for fabricating a photonic integrated circuit (PIC) with an embedded optical power monitor. The method can include creating a photomask based on a design of the PIC, the photomask comprising a pattern defining an optical waveguide for embedding the optical power monitor. Creating the photomask can include introducing a predetermined level of roughness along at least one edge of the pattern defining the optical waveguide. The method can further include fabricating the PIC, which can include using the photomask to create the optical waveguide with the introduced roughness on a sidewall corresponding to the edge of the pattern, thereby allowing light absorbed by the roughness to create free carriers for detection by the optical power monitor.

In a variation on this aspect, the optical waveguide can include a silicon-on-insulator (SOI) rib waveguide.

In a variation on this aspect, the level of roughness can be determined based on a predetermined level of power-monitoring sensitivity, dimensions and material system of the optical waveguide, and precision of the fabrication of the PIC.

In a variation on this aspect, a length of the edge with the introduced roughness can be between 50 and 200 µm.

In a variation on this aspect, a correlation length of the roughness is between 50 and 200 nm.

In a variation on this aspect, the photomask can include a curved pattern defining a curved section of an optical waveguide for embedding an additional power monitor at the curved section. The curved pattern can include one or more smooth edges.

In a variation on this aspect, the roughness can be introduced on both edges of the pattern defining the optical waveguide.

In a variation on this aspect, creating the photomask can include obtaining an initial photomask, with waveguide-defining patterns in the initial photomask all having smooth edges, identifying a pattern that defines the optical waveguide for embedding the optical power monitor, and modifying at least one smooth edge of the identified pattern by introducing the roughness.

In a variation on this aspect, fabricating the PIC can include performing a photolithography process using the photomask as a photoresist exposure mask to create a waveguide etch mask and performing a dry etching process using the waveguide etch mask.

One aspect can provide a photomask for fabricating a photonic integrated circuit (PIC) with an embedded waveguide-based optical power monitor. The photomask can include a plurality of device patterns defining optical devices within the PIC and a plurality of waveguide patterns defining optical waveguides coupling the optical devices within the PIC. At least one waveguide pattern defines an optical waveguide for embedding the waveguide-based optical power monitor, and at least one edge of the waveguide pattern comprises a predetermined level of roughness.

One aspect can provide a photonic integrated circuit (PIC) with an embedded optical power monitor. The PIC is fabricated by creating a photomask based on a design of the PIC, the photomask comprising a pattern defining an optical waveguide for embedding the optical power monitor. Creating the photomask can include introducing a predetermined level of roughness along at least one edge of the pattern defining the optical waveguide. The PIC can further be fabricated using the photomask to create the optical waveguide with the introduced roughness on a sidewall corresponding to the edge of the pattern, thereby allowing light absorbed by the roughness to create free carriers for detection by the optical power monitor.

The foregoing description is presented to enable any person skilled in the art to make and use the embodiments and is provided in the context of a particular application and its requirements. Various modifications to the disclosed embodiments will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method for fabricating a photonic integrated circuit (PIC) with an embedded optical power monitor, the method comprising:
    creating a photomask based on a design of the PIC, wherein the photomask comprises a pattern defining an optical waveguide for embedding the optical power monitor, and wherein creating the photomask comprises introducing a predetermined level of roughness along at least one edge of the pattern defining the optical waveguide; and
    fabricating the PIC, which comprises using the photomask to create the optical waveguide with the introduced roughness on a sidewall corresponding to the edge of the pattern, thereby allowing light absorbed by the roughness to create free carriers for detection by the optical power monitor.

2. The method of claim 1, wherein the optical waveguide comprises a silicon-on-insulator (SOI) rib waveguide.

3. The method of claim 1, wherein the level of roughness is determined based on a predetermined level of power-monitoring sensitivity, dimensions and material system of the optical waveguide, and precision of the fabrication of the PIC.

4. The method of claim 1, wherein a length of the edge with the introduced roughness is between 50 and 200 μm.

5. The method of claim 1, wherein a correlation length of the roughness is between 50 and 200 nm.

6. The method of claim 1, wherein the photomask further comprises a curved pattern defining a curved section of an optical waveguide for embedding an additional power monitor at the curved section, wherein the curved pattern comprises one or more smooth edges.

7. The method of claim 1, wherein the roughness is introduced on both edges of the pattern defining the optical waveguide.

8. The method of claim 1, wherein creating the photomask comprises:
    obtaining an initial photomask, wherein waveguide-defining patterns in the initial photomask all have smooth edges;
    identifying a pattern that defines the optical waveguide for embedding the optical power monitor; and
    modifying at least one smooth edge of the identified pattern by introducing the roughness.

9. The method of claim 1, wherein fabricating the PIC comprises:
    performing a photolithography process using the photomask as a photoresist exposure mask to create a waveguide etch mask; and
    performing a dry etching process using the waveguide etch mask.

10. A photomask for fabricating a photonic integrated circuit (PIC) with an embedded waveguide-based optical power monitor, comprising:
    a plurality of device patterns defining optical devices within the PIC; and
    a plurality of waveguide patterns defining optical waveguides coupling the optical devices within the PIC;
    wherein at least one waveguide pattern defines an optical waveguide for embedding the waveguide-based optical power monitor, and wherein at least one edge of the waveguide pattern comprises a predetermined level of roughness, thereby allowing light absorbed by the roughness to create free carriers for detection by the optical monitor.

11. The photomask of claim 10, wherein the level of roughness is determined based on a predetermined level of power-monitoring sensitivity, dimensions and material system of the optical waveguide, and precision of a fabrication process for fabricating the PIC.

12. The photomask of claim 10, wherein a length of the edge comprising the roughness is between 50 and 200 μm.

13. The photomask of claim 10, wherein a correlation length of the roughness is between 50 and 200 nm.

14. The photomask of claim 10, wherein the waveguide patterns comprise a curved pattern defining a curved section of an optical waveguide for embedding an additional power monitor at the curved section, wherein the curved pattern comprises one or more smooth edges.

15. The photomask of claim 10, wherein both edges of the waveguide pattern defining the optical waveguide comprise roughness.

16. The photomask of claim 10, wherein the photomask is created by:
    obtaining an initial photomask, wherein waveguide-defining patterns in the initial photomask all have smooth edges;
    identifying a pattern that defines the optical waveguide for embedding the waveguide-based optical power monitor; and
    modifying at least one smooth edge of the identified pattern by introducing the roughness.

17. A photonic integrated circuit (PIC) with an embedded optical power monitor, wherein the PIC is fabricated by:
    creating a photomask based on a design of the PIC, wherein the photomask comprises a pattern defining an optical waveguide for embedding the optical power monitor, and wherein creating the photomask comprises introducing a predetermined level of roughness along at least one edge of the pattern defining the optical waveguide; and
    using the photomask to create the optical waveguide with the introduced roughness on a sidewall corresponding to the edge of the pattern, thereby allowing light absorbed by the roughness to create free carriers for detection by the optical power monitor.

18. The PIC of claim 17, wherein the level of roughness is determined based on a predetermined level of power-monitoring sensitivity, dimensions and material system of the optical waveguide, and precision of a fabrication process for fabricating the PIC.

19. The PIC of claim 17, wherein a length of the edge with the introduced roughness is between 50 and 200 µm; and
   wherein a correlation length of the roughness is between 50 and 200 nm.

20. The PIC of claim 17, wherein the PIC is fabricated by:
   performing a photolithography process using the photomask as a photoresist exposure mask to create a waveguide etch mask; and
   performing a dry etching process using the waveguide etch mask.

* * * * *